UNITED STATES PATENT OFFICE.

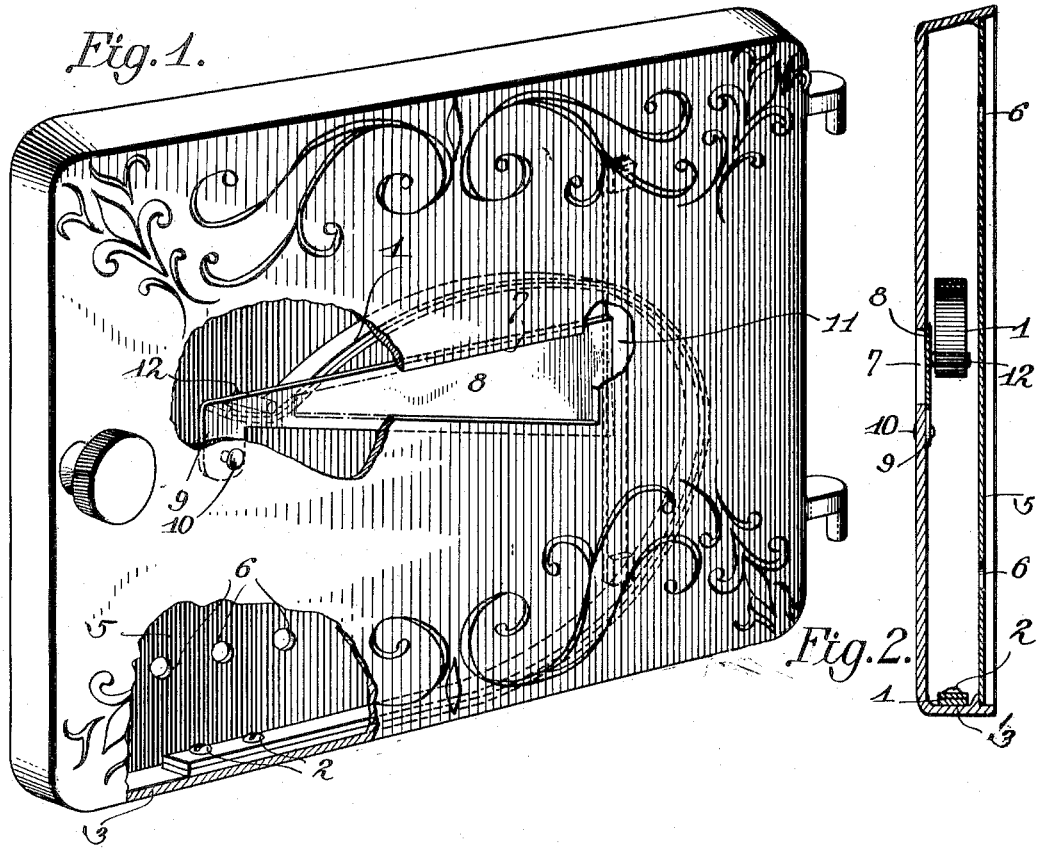

JOHN P. FARMER, OF PORTLAND, OREGON.

AUTOMATIC REGULATOR FOR OVENS.

No. 817,106.     Specification of Letters Patent.     Patented April 3, 1906.

Application filed August 31, 1904. Serial No. 222,887.

*To all whom it may concern:*

Be it known that I, JOHN P. FARMER, a citizen of the United States, residing at Portland, in the county of Multnomah and State of Oregon, have invented a new and useful Automatic Regulator for Ovens, of which the following is a specification.

This invention relates to regulators for ovens; and it has for its object to provide an improved contrivance whereby the degree of heat within the oven may be automatically regulated and maintained at a predetermined point for the purpose of preventing overheating and the scorching and burning of the contents of the oven which is apt to result therefrom.

With these and other objects in view my invention consists in the improved construction, arrangement, and combination of parts, which will be hereinafter fully described, and particularly pointed out in the claim.

In the accompanying drawings, Figure 1 is a perspective view showing one form of my improved regulating device applied to an ordinary oven-door. Fig. 2 is a vertical transverse sectional view of the same.

Corresponding parts in both figures are indicated by similar numerals of reference.

My invention includes a thermostat and a damper or valve operated thereby, the thermostat being actuated by increase of heat within the oven to open the valve or damper for the escape of excessive heat, while a reduction of temperature below a predetermined point will operate to effect the closure of the valve or damper.

The invention is applied to the door of an ordinary oven. When the invention is thus applied, a thermostat (designated 1) is connected, by means of screws or bolts 2, to the lower ledge 3 of the oven-door, between the bulging front of said oven-door and the lining 5. In cases where such lining is lacking in the oven-door it is preferably supplied for the purpose of preventing access to and meddling with the thermostat. The lining-plate 5 is preferably provided with a plurality of openings 6, and the front of the oven-door is provided with a slot, as 7, adapted to be closed by means of a valve or damper 8, having a depending lip 9 for the reception of a pivotal pin or bolt 10. The free or movable end of the damper is preferably confined by means of a guide-strip 11, secured to the oven-door in order to cause it to move smoothly and easily. The damper 8 is provided with a forwardly-projecting pin 12, engaging the free end of the thermostat in such a manner that when expanded by heat said thermostat shall operate to open the damper, and vice versa.

The device is simple, easily applied, and efficient for the purposes for which it is provided.

Having thus described the invention, what is claimed is—

In a device of the class described, an oven-door having a ledge or flange and provided with an aperture, a damper supported pivotally adjacent to the aperture and normally covering the same, said damper being provided with a projection, a thermostat secured upon the ledge of the oven-door, extending into the path of the projection of the damper and supporting the latter, a strip connected with the oven-door and confining and guiding the free end of the damper, and a lining consisting of an apertured plate combining with the door to form a casing for the thermostat.

In testimony that I claim the foregoing as my own I have hereto affixed my signature in the presence of two witnesses.

JOHN P. FARMER.

Witnesses:
   A. F. FLEGEL,
   WM. T. MUIR.